United States Patent Office 2,728,654
Patented Dec. 27, 1955

2,728,654

SUBSTITUTED UREA HERBICIDES

Henry J. Gerjovich, Wilmington, Del., assignor to E. I. du Pont de Nemours and Company, Wilmington, Del., a corporation of Delaware No Drawing. Application October 13, 1953, Serial No. 385,894

8 Claims. (Cl. 71—2.6)

This invention relates to herbicidal compositions and methods employing as an essential active ingredient one or more tri-substituted ureas represented by the formula (1) 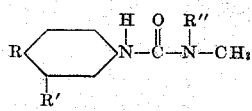

where R is selected from the group consisting of hydrogen and alkyl of 1 to 4 carbon atoms, R' is selected from the group consisting of hydrogen and methyl, and R" is selected from the group consisting of propyl and butyl.

The tri-substituted ureas employed in the herbicidal compositions and methods of this invention are suitably prepared, for example, by reaction of a phenyl or substituted phenyl carbamyl chloride with a methylpropyl or methylbutyl amine. The process is illustrated by the following equation but it will be understood by suitable choice of the carbamyl chloride reactant and the secondary amine that other tri-substituted ureas are similarly prepared (2) 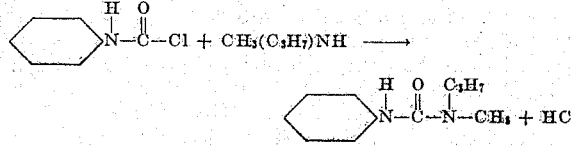

The carbamyl chloride-amine reaction is most readily carried out in the presence of an inert solvent such as dioxane, ethyl ether, or anisole. The reaction proceeds more rapidly at somewhat elevated temperatures say at the reflux temperature of the reaction medium. No catalyst is needed.

Illustrative of the tri-substituted ureas employed in the compositions and methods of the invention are:

3-phenyl-1-methyl-1-propylurea
3-phenyl-1-methyl-1-isopropylurea
3-phenyl-1-methyl-1-sec. butylurea
3-phenyl-1-methyl-1-n-butylurea
3-m-tolyl-1-methyl-1-sec. butylurea
3-p-tolyl-1-methyl-1-sec. butylurea
3-(3,4-dimethylphenyl)-1-methyl-1-sec. butylurea
3-(4-isopropylphenyl)-1-methyl-1-sec. butylurea
3-(4-sec. butylphenyl)-1-methyl-1-isopropylurea
3-(4-ethylphenyl)-1-methyl-1-n-propylurea The herbicidal compositions of the invention are prepared by admixing one or more of the tri-substituted ureas with a carrier material or conditioning agent of the kind used and referred to in the art as a pest control adjuvant or modifier in order to provide formulations adapted for ready and efficient application to soil, weeds, or unwanted plants using conventional applicator equipment.

Thus the tri-substituted urea material is admixed with carrier or adjuvant materials to provide formulations in liquid or solid form. Solid compositions are preferably in the form of dusts and are compounded to give homogeneous free-flowing dusts by admixing the active compound with finely divided solids preferably talcs, natural clays, pyrophyllite, diatomaceous earth, and flours such as walnut shell, wheat, redwood, soya bean, cottonseed flours, and other inert solid carriers of the kind conventionally employed in preparing pest control compositions and dusts or powdered form.

Liquid compositions employing the active ingredients are prepared in the usual way by admixing the active ingredient with a conventional liquid diluent media. The tri-substituted ureas are quite insoluble in most liquids altho solutions containing them at low concentration can be made if desired using various of the common organic solvents such as cyclohexanol, acetone, ethanol, isobutanol, furfural, isopropyl acetate, and the like. More preferably, the liquid compositions are prepared in more concentrated form so that the liquid composition is primarily a suspension of the active compound in the liquid. In preparing such compositions conventional spray oils, alkylated naphthalene, or fats, or similar vehicles such as cottonseed oil, olive oil, lard, paraffin oil, hydrogenated vegetable oil and similar conventional organic liquid diluents are suitably employed.

The herbicidal compositions of the invention whether in the form of dusts or liquids preferably also include a surface active dispersing agent of the kind sometimes referred to in the art as wetting, dispersing, and emulsifying agents.

The surface active dispersing agents employed can be of the anionic, cationic, or nonionic type and include, for example, sodium oleate, sulfonated petroleum oils, sodium lauryl sulfate, polyethylene oxides, and other surface active dispersing agents such as those listed in detail in articles by McCutcheon in Soap and Sanitary Chemicals, August, September, and October of 1949.

The amount of surface active dispersing agent employed in compositions of the invention will vary depending upon the effectiveness of the particular surface active dispersing agent employed and the properties of other materials in the composition. Generally, the surface active dispersing agent will not comprise more than about 10% by weight of the composition and with the better materials will be 5% or less.

The content of the active tri-substituted urea or ureas employed in the herbicidal compositions of the invention will vary according to the manner in which and the purpose for which the composition is to be applied but in general will be from 0.5 to 95% by weight of the composition.

The herbicidal compositions are applied either as a spray or in the form of a dust to the locus or area to be protected from undesirable plant growth. The tri-substituted urea is, of course, applied in amount sufficient to exert the desired plant killing action. The application can be made directly upon the locus or area during the period of infestation of unwanted plant growth or alternatively the application can be made in advance of an anticipated infestation.

In applying the herbicidal compositions of the invention for selective weed control as in the control of weeds in cotton or corn fields, the compositions are preferably applied after planting of the crop seeds but before emergence of the seedlings. In other words, the applications are of the pre-emergence type.

Fertilizer materials, other herbicidal agents, and other pest control agents such as insecticides and fungicides can be included in the herbicidal compositions of the invention if desired.

In order that the invention may be better understood, the following examples are given in addition to the examples already given above.

Example 1

8 parts by weight of methylisopropylamine was gradually added to 11.9 parts by weight of phenyl isocyanate in 100 parts by weight toluene over a period of 10 minutes. The mixture was then stirred and heated at reflux temperature for 30 minutes. The reaction mass was then cooled and the crystallized product separated by filtration to yield 18 parts by weight of 3-phenyl-1-methyl-1-isopropylurea, M. P. 129.5–131° C.

*Analysis.*—Calc'd. for $C_{11}H_{16}N_2O$: N, 14.57. Found: N, 14.65.

The compound prepared as above was formulated as a wettable powder containing 80% of the tri-substituted urea. This formulation killed cut off quack grass when applied at a dosage of 18 pounds of the tri-substituted urea per acre.

Example 2

9.5 parts by weight of methyl-n-butylamine was gradually added to 11.9 parts by weight of phenyl isocyanate in 100 parts by weight toluene over a period of 10 minutes. The mixture was then stirred and heated at reflux temperature for 30 minutes. The toluene was then removed by distillation under reduced pressure and the residue recrystallized from hexane. There was obtained 19 parts by weight of 3-phenyl-1-methyl-1-n-butylurea, M. P. 79.5–80.5° C.

*Analysis.*—$C_{12}H_{18}N_2O$ calc'd.: N, 13.59. Found: N, 13.59.

The compound prepared above is formulated as a water dispersible powder by mixing and grinding it with conditioning agents of the kind, and in the proportions by weight, shown below

| | |
|---|---|
| 3-phenyl-1-methyl-1-n-butylurea | 80 |
| Bentonite | 18 |
| Sodium disulfonate of dibutyl phenylphenol | 2 |

An application of an 80% formulation of 3-phenyl-1-methyl-1-n-butylurea as a pre-emergence treatment at a rate of three pounds per acre to an area planted with corn and cotton gave control of emerging weeds without damage to the corn or the cotton.

Example 3

The following powdered composition is adapted for use in the preparation of a spray composition using either an oil, water, or a combination of oil and water as the liquid diluent. The powder is made by mixing and grinding the ingredients to give a composition having an average particle size less than about 50 microns.

| | |
|---|---|
| 3-phenyl-1-methyl-1-n-propylurea | 70 |
| Alkylated aryl polyether alcohol (surface active agent) | 4 |
| Fuller's earth | 26 |

Example 4

The following composition is in a liquid form and is adapted for addition to water to give an aqueous dispersion for application as a spray. The tri-substituted urea herbicides are generally quite insoluble in most oils. Therefore, the liquid composition such as the composition of this example ordinarily are not complete solutions but rather are dispersions of solid in an oil. The liquid or fluid composition shown is prepared by thoroughly mixing and dispersing the active compound and conditioning agent or agents in an organic liquid diluent.

| | |
|---|---|
| 3-phenyl-1-methyl-1-sec. butylurea | 25 |
| Long chain fatty alcohol sulfate (surface active agent) | 2 |
| Goulac (surface active agent) | 3 |
| Kerosene | 70 |

Example 5

The following composition is adapted for application by means of a fertilizer spreader apparatus or similar equipment. The composition is readily prepared by mixing the ingredients with water to form a paste. The paste is then extruded, dried, and ground to give the desired granular size. Preferably the granules will be in the order of one thiry-second to one quarter inch diameter.

| | |
|---|---|
| 3-p-tolyl-1-methyl-1-sec. butylurea | 10 |
| Goulac (surface active agent) | 3 |
| Hydrocarbon oil | 1 |
| Dextrin (binding agent) | 20 |
| Fuller's earth | 66 |

Example 6

The following formulation is adapted for direct application as a dust for the destruction or prevention of weeds using conventional dusting equipment. The dust is made by blending or mixing the ingredients and grinding the mix to give a composition having an average particle size less than about 50 microns.

| | |
|---|---|
| 3-(4-ethylphenyl)-1-methyl-1-n-propylurea | 20 |
| Talc | 80 |

The foregoing detailed description has been given for clearness of understanding only and no unnecessary limitations are to be understood therefrom. The invention is not limited to the exact details shown and described for obvious modifications will occur to those skilled in the art.

I claim:

1. A method for the control of weeds which comprises applying to a locus to be protected from the weeds, in amount sufficient to exert a herbicidal action, a tri-substituted urea represented by the formula

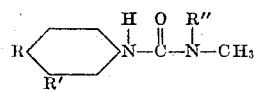

where R is selected from the group consisting of hydrogen and alkyl of 1 to 4 carbon atoms, R' is selected from the group consisting of hydrogen and methyl, and R" is selected from the group consisting of propyl and butyl.

2. A method of claim 1 in which the tri-substituted urea compound is 3-phenyl-1-methyl-1-n-propyl urea.

3. A method of claim 1 in which the tri-substituted urea is 3-phenyl-1-methyl-1-isopropyl urea.

4. A method of claim 1 in which the tri-substituted urea is 3-phenyl-1-methyl-1-n-butyl urea.

5. A herbicidal composition comprising in herbicidal concentration in admixture with a pest control adjuvant a tri-substituted urea represented by the formula

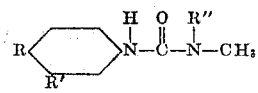

where R is selected from the group consisting of hydrogen and alkyl of 1 to 4 carbon atoms, R' is selected from the group consisting of hydrogen and methyl, and R" is selected from the group consisting of propyl and butyl.

6. A composition of claim 5 in which the tri-substituted urea is 3-phenyl-1-methyl-1-n-propyl urea.

7. A composition of claim 5 in which the tri-substituted urea is 3-phenyl-1-methyl-1-isopropyl urea.

8. A composition of claim 5 in which the tri-substituted urea is 3-phenyl-1-methyl-1-n-butyl urea.

References Cited in the file of this patent

UNITED STATES PATENTS

| | | |
|---|---|---|
| 2,655,446 | Todd | Oct. 13, 1953 |
| 2,655,447 | Todd | Oct. 13, 1953 |
| 2,655,534 | Searle | Oct. 13, 1953 |